(12) United States Patent
Sihlbom et al.

(10) Patent No.: US 10,249,961 B2
(45) Date of Patent: Apr. 2, 2019

(54) TRANSMIT DEVICE AND METHOD THEREOF

(71) Applicant: Huawei Technologies Co., Ltd., Shenzhen (CN)

(72) Inventors: Björn Sihlbom, Gothenburg (SE); Mattias Gustafsson, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/825,302

(22) Filed: Nov. 29, 2017

(65) Prior Publication Data

US 2018/0090853 A1 Mar. 29, 2018

Related U.S. Application Data

(63) Continuation of application No. PCT/EP2015/061963, filed on May 29, 2015.

(51) Int. Cl.
| | |
|---|---|
| *H04M 1/00* | (2006.01) |
| *H01Q 21/06* | (2006.01) |
| *H04B 7/0456* | (2017.01) |
| *H01Q 9/04* | (2006.01) |
| *H04B 7/10* | (2017.01) |
| *H04B 7/0452* | (2017.01) |

(52) U.S. Cl.
CPC ......... *H01Q 21/065* (2013.01); *H01Q 9/0407* (2013.01); *H01Q 9/0435* (2013.01); *H04B 7/0469* (2013.01); *H04B 7/10* (2013.01); *H01Q 9/0478* (2013.01); *H04B 7/0452* (2013.01)

(58) Field of Classification Search
CPC .... H01Q 21/065; H01Q 9/047; H01Q 9/0435; H01Q 21/06; H04B 7/0469; H04B 7/10

USPC ................. 455/25, 63.4, 562.1, 575.7
See application file for complete search history.

(56) References Cited

U.S. PATENT DOCUMENTS

| | | | | |
|---|---|---|---|---|
| 9,509,387 B2* | 11/2016 | Athley | .............. | H01Q 3/26 |
| 9,960,828 B2* | 5/2018 | Petersson | ............. | H04B 7/0617 |
| 2006/0164284 A1* | 7/2006 | Pauplis | ................. | G01S 7/2813 |
| | | | | 342/16 |
| 2013/0057432 A1 | 3/2013 | Rajagopal et al. | | |

(Continued)

FOREIGN PATENT DOCUMENTS

| | | | |
|---|---|---|---|
| WO | 2014026443 A1 | 2/2014 | |
| WO | WO 2014/206443 A1 * | 12/2014 | ............... H04B 7/04 |

OTHER PUBLICATIONS

Xu, G. et al.,"Full-Dimension MIMO: Status and Challenges in Design and Implementation," Samsung, May 27, 2014, 21 pages.

(Continued)

*Primary Examiner* — Sonny Trinh
(74) *Attorney, Agent, or Firm* — Slater Matsil, LLP

(57) ABSTRACT

Embodiments relate to a transmit device, the transmit device comprising: at least one logical antenna port configured to provide a broadcast component signal; an antenna array having M number of rows and N number of columns of antenna elements; and a processor configured to select Q number of columns among the N number of columns, where Q≤N, determine a phase center location (PCL) for the logical antenna port, wherein the phase center location is arranged in a point on a vertical axis (A) located in the Q number of columns, map the logical antenna port on the physical antenna ports of the Q number of columns.

20 Claims, 13 Drawing Sheets

(56) References Cited

U.S. PATENT DOCUMENTS

| | | |
|---|---|---|
| 2013/0286960 A1 | 10/2013 | Li et al. |
| 2014/0177745 A1* | 6/2014 | Krishnamurthy .... H04B 7/0413 375/267 |
| 2015/0143483 A1 | 5/2015 | Wong et al. |

OTHER PUBLICATIONS

Wikipedia, "Virtual Antenna Mapping," retrieved from https://en.wikipedia.org/w/index.php?title=Virtual_Antenna_Mapping&oldid=735967385 Feb. 3, 2018, 1 page.

Ericsson, "Coverage aspects of increasing the number of antenna ports," 3GPP TSG-RAN WG1#79, R1-145360, San Francisco, CA, USA, Nov. 17-21, 2014, 7 pages.

LG Electronics, "Antenna modeling for 3D channel studies," 3GPP TSG RAN WG1 Meeting #73, R1-132243, Fukuoka, Japan, May 20-24, 2013, 5 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.5.0 (Mar. 2015), 251 pages.

* cited by examiner

TRANSMIT DEVICE AND METHOD THEREOF

CROSS-REFERENCE TO RELATED APPLICATIONS

This application is a continuation of International Application No. PCT/EP2015/061963, filed on May 29, 2015, the disclosure of which is hereby incorporated by reference in its entirety.

TECHNICAL FIELD

The present invention relates to a transmit device. Furthermore, the present invention also relates to a corresponding method, a computer program, and a computer program product.

BACKGROUND

A Multiple Input Multiple Output (MIMO) antenna system normally encompasses two fundamentally different physical channels, namely the broadcast channel and the shared channel. The broadcast channel transmits information that needs to be received by all user terminals (e.g. User Equipment, UEs) within the intended cell coverage of the Base Station (BS). The shared channel on the other hand is sliced up in time-frequency-space fragments where some user terminals use some fragments and some other user terminals use other fragments.

The synchronization and cell search signals Primary Synchronization Channel (PSCH) and Secondary Synchronization Channel (SSCH), the Physical Broadcast Channel (PBCH), the cell specific Reference Signals (RS), the control signals (PCFICH, PHICH, PDCCH) have the common property that these need to be broadcasted all over the cell that is intended to be covered by the BS.

Further, there are a number of possible transmission modes in 3GPP Long Term Evolution (LTE). The LTE system allows for quite high flexibility in number of logical antenna ports to be used, and how to use mentioned antenna ports. Information about the transmission modes is given in the specifications for LTE.

Moreover, the number of logical antenna ports in a MIMO antenna system is drastically increased compared to the number of logical antenna ports in a conventional BS antenna system. In the conventional antenna system there are only two antenna ports, while it is common to have 8 or even higher number of antenna ports in MIMO BS antenna systems. For a BS with few wide beam antennas it is a simple task to achieve broadcast beamforming, since the mapping of a signal on one antenna port only, the single wide beam antenna inherently generates a wide beam. Therefore, the signals transmitted on this antenna will be heard widely over the cell. The same principle also applies for a MIMO BS antenna system. A signal transmitted on a single antenna will be widely transmitted over the spatial domain. However, when the number of antennas and amplifiers in a MIMO antenna system increases, this also implies that the available power per antenna port decreases, so the widely transmitted beam will have less power the more ports the MIMO system has.

SUMMARY

An objective of some embodiments of the present invention is to provide a solution which mitigates or solves the drawbacks and problems of conventional solutions.

An "or" in this description and the corresponding claims is to be understood as a mathematical OR which covers "and" and "or", and is not to be understood as an XOR (exclusive OR).

The above objectives are solved by the subject matter of the independent claims. Further advantageous implementation forms of the present invention can be found in the dependent claims.

According to a first aspect of embodiments of the invention, the above mentioned and other objectives are achieved with a transmit device for a wireless communication system. The transmit device comprises at least one logical antenna port configured to provide a broadcast component signal. The transmit device also comprises an antenna array having M number of rows and N number of columns of antenna elements, wherein each antenna element comprises at least one physical antenna port in one polarization. The transmit device also comprises a processor configured to: select Q number of columns among the N number of columns, where Q≤N, determine a phase centre location for the logical antenna port, wherein the phase centre location is arranged in a point on a vertical axis located in the Q number of columns, and map the logical antenna port on the physical antenna ports of the Q number of columns based on the determined phase centre location. The antenna array is configured to transmit the broadcast component signal on the mapped physical antenna ports of the Q number of columns.

The expression "at least one logical antenna port" means that there can be one or more logical antenna ports configured to provide broadcast component signals. That is, there are S number of logical antenna ports, where S≥1. Each logical antenna port is mapped to Q columns of the N number of columns of physical antenna ports. The vertical axis is located in a position in the area which is spanned up by the Q number of selected columns. Further, each antenna element comprises P number of physical antenna ports, where P≥1.

By determining a phase centre location for the (at least one) logical antenna port according to the first aspect and transmit the broadcast component signal on the mapped physical antenna ports of the Q number of columns a number of advantages are provided.

One advantage of the present mapping is that all the power amplifiers included in these Q columns can be used to amplify the broadcast signal, thereby increasing the radiation intensity and the probability of detection everywhere in the cell to be covered. Another advantage is that by having the flexibility to let Q be less than N, it is possible to create several phase centres over the antenna aperture, thereby making it possible to map an equivalent number of logical antenna ports on these phase centres.

In a first possible implementation form of a transmit device according to the first aspect, each antenna element comprises two physical antenna ports in a first polarization and in a second polarization, respectively, wherein the first polarization is orthogonal to the second polarization.

An advantage with the first possible implementation form is that two broadcast signals simultaneously can be transmitted, by transmitting the first broadcast signal in the first polarization and the second broadcast signal in the second polarization.

In a second possible implementation form of a transmit device according to the first possible implementation form of the first aspect or to the first aspect as such, the transmit device comprise one logical antenna port and where Q=N.

An advantage with the second possible implementation form is that by mapping a broadcast signal on all available columns (i.e. Q=N), the transmitter power amplifier usage ratio is Q/N=100% meaning that all the available power is used.

In a third possible implementation form of a transmit device according to the first possible implementation form of the first aspect or to the first aspect as such, the transmit device comprise two logical antenna ports and where Q=N, and wherein one logical antenna port is mapped on the physical antenna ports in the first polarization and wherein the other logical antenna port is mapped on the physical antenna ports in the second polarization.

An advantage with the third possible implementation form is that also for this case the power amplifier usage ratio is 100%. In addition to this, two broadcast signals can be simultaneously transmitted, each in one of the two polarizations.

In a fourth possible implementation form of a transmit device according to any of the preceding possible implementation forms of the first aspect or to the first aspect as such, the processor further is configured to generate a row wise excitation vector and a column wise excitation vector based on the phase centre location, excite the component broadcast signal with the row wise excitation vector and the column wise excitation vector for controlling the elevation beam and the azimuth beam, respectively, of the transmitted component broadcast signal.

An advantage with the fourth possible implementation form is that also electronical beam-tilt is achieved in the elevation domain, making it possible to flexibly direct the broadcast beam closer to or farther away from the transmit device.

In a fifth possible implementation form of a transmit device according to the fourth possible implementation form of the first aspect, each column of the column wise excitation vector has an amplitude that is equal to: $1/\sqrt{Q}$; and each antenna element excitation being the combination of the row wise excitation vector and the column wise excitation vector has an amplitude that is equal to: $1/\sqrt{QM}$ and each physical antenna port excitation being the combination of a number of physical antenna ports P per antenna element and the row wise excitation vector and the column wise excitation vector has an amplitude that is equal to: $1/\sqrt{QMP}$.

An advantage with the fifth possible implementation form is that this leads to a uniform amplitude excitation for all physical antenna ports in the array of Q×M antenna elements. This in turn leads to that no amplitude tapering of the amplifiers is needed, and all of them hence can transmit the signal on maximum amplitude level.

In a sixth possible implementation form of a transmit device according to the fourth or fifth possible implementation form of the first aspect, the column wise excitation vector is symmetric.

The column wise excitation vector may be symmetric such that mirroring of the column wise excitation vector around its centre element results in the same vector.

An advantage with the sixth possible implementation form is that the radiated beam will radiate in the front direction relative to the aperture of the surface spanned by the Q×M antenna elements, and thereby illuminate the area intended to be covered by the broadcast signal.

In a seventh possible implementation form of a transmit device according to the fourth, fifth or sixth possible implementation form of the first aspect, the elements of the column wise excitation vector are generated by using a geometric method such that the phase of the transmitted component broadcast signal has a variation less than a phase threshold value within an azimuth beamwidth.

The azimuth beamwidth should according to an example be a wanted azimuth beamwidth. Wanted in this context means that the radiation intensity within the azimuth beamwidth is not reduced more than a specific relative level compared to the maximum radiation intensity within the same beam, normally expressed in terms of dB, for instance −3 dB, −6 dB or −10 dB, but other values are also possible.

An advantage with the seventh possible implementation form is that mapping a broadcast signal onto a beam having its phase centre in a point located within the area spanned by Q columns by M rows will reduce its correlation to another broadcast signal that has its phase centre in another point defined by another selection of Q columns by M rows, which in turn improves MIMO and diversity performance.

In an eighth possible implementation form of a transmit device according to the fourth, fifth, sixth, or seventh possible implementation form of the first aspect, the elements of the column wise excitation vector are generated by using a geometric method such that the amplitude of the transmitted component broadcast signal has a variation less than an amplitude threshold value within an azimuth beamwidth.

The azimuth beamwidth should according to an example be a wanted azimuth beamwidth. Wanted in this context means that the radiation intensity within the azimuth beamwidth is not reduced more than a specific relative level compared to the maximum radiation intensity within the same beam, normally expressed in terms of dB, for instance −3 dB, −6 dB or −10 dB, but other values are also possible.

An advantage with the eighth possible implementation form is that minimizing the amplitude taper of the Q selected columns implies maximization of the usage ratio of the amplifiers, since all of them can transmit on their maximum level.

In a ninth possible implementation form of a transmit device according to the seventh or eighth possible implementation form of the first aspect, the geometric method is based on one or more parameters in the group comprising: radiation characteristics for the antenna elements, spatial distance between the antenna elements, frequency of the transmitted component broadcast signal, and the wanted azimuth beamwidth of the transmitted broadcast component signal.

An advantage with the ninth possible implementation form is that any deviations of characteristics of antenna elements in the array can be accounted for by selecting the equivalent excitations on an element level.

In a tenth possible implementation form of a transmit device according to the any of the preceding possible implementation forms of the first aspect or to the first aspect as such, $Q \geq 2$ and wherein the phase centre location is in the centre axis of the Q number of columns.

An advantage with the tenth possible implementation form is that any choice of $Q \geq 2$ will create an array antenna in the horizontal domain, making it possible to capitalize on array gain.

In an eleventh possible implementation form of a transmit device according to the any of the preceding possible implementation forms of the first aspect or to the first aspect as such, each physical antenna port is coupled to a corresponding independent transmitter amplifier.

An advantage with the eleventh possible implementation form is that by using an independent transmitter per physical antenna port reduces the power capabilities needed per amplifier, contrary to the situation when one transmitter drives all antenna ports. Simpler and cheaper transmitter circuitry can hence be used.

In a twelfth possible implementation form of a transmit device according to the any of the preceding possible implementation forms of the first aspect or to the first aspect as such, the component broadcast signal is used as a cell specific reference signal or used in one or more broadcast signals for channels in the group comprising: Primary Synchronisation Channel, Secondary Synchronisation Channel, Physical Broadcast Channel, Physical Control Format Indicator Channel, Physical Hybrid Automatic Repeat Request Indicator Channel, and Physical Downlink Control Channel.

An advantage with the twelfth possible implementation form is that the signals listed will be mapped to the complete array or a subset thereof, thereby maximizing the usage of the available transmitter power and also maximizing the usage of possible array gain, and also minimizing the correlation of the broadcast signals transmitted from different phase centres.

According to a second aspect of embodiments of the invention, the above mentioned and other objectives are achieved with a method for a transmit device. The transmit device includes at least one logical antenna port configured to provide a broadcast component signal, and an antenna array having M number of rows and N number of columns of antenna elements, wherein each antenna element comprises at least one physical antenna port in one polarization. The method comprises selecting Q number of columns among the N number of columns, where Q≤N, determining a phase centre location for the logical antenna port, wherein the phase centre location is arranged in a point on a vertical axis located in the Q number of columns, mapping the logical antenna port on the physical antenna ports of the Q number of columns based on the determined phase centre location, and transmitting the broadcast component signal on the mapped physical antenna ports of the Q number of columns.

In a first possible implementation form of a method according to the second aspect, each antenna element comprises two physical antenna ports in a first polarization and in a second polarization, respectively, wherein the first polarization is orthogonal to the second polarization.

In a second possible implementation form of a method according to the first possible implementation form of the second aspect or to the second aspect as such, the transmit device comprise one logical antenna port and where Q=N.

In a third possible implementation form of a method according to the first possible implementation form of the second aspect or to the second aspect as such, the transmit device comprise two logical antenna ports and where Q=N, and wherein the method further comprises: mapping one logical antenna port on the physical antenna ports in the first polarization and mapping the other logical antenna port on the physical antenna ports in the second polarization.

In a fourth possible implementation form of a method according to any of the preceding possible implementation forms of the second aspect or to the second aspect as such, the method further comprises generating a row wise excitation vector and a column wise excitation vector based on the phase centre location, exciting the component broadcast signal with the row wise excitation vector and the column wise excitation vector for controlling the elevation beam and the azimuth beam, respectively, of the transmitted component broadcast signal.

In a fifth possible implementation form of a method according to the fourth possible implementation form of the second aspect, each column of the column wise excitation vector has an amplitude that is equal to: $1/\sqrt{Q}$; and each antenna element excitation being the combination of the row wise excitation vector and the column wise excitation vector has an amplitude that is equal to: $1/\sqrt{QM}$; and each physical antenna port excitation being the combination of a number of physical antenna ports P per antenna element and the row wise excitation vector and the column wise excitation vector has an amplitude that is equal to: $1/\sqrt{QMP}$.

In a sixth possible implementation form of a method according to the fourth or fifth possible implementation form of the second aspect, the column wise excitation vector is symmetric.

In a seventh possible implementation form of a method according to the fourth, fifth or sixth possible implementation form of the second aspect, the method further comprising generating the elements of the column wise excitation vector by using a geometric method such that the phase of the transmitted component broadcast signal has a variation less than a phase threshold value within an azimuth beamwidth.

In an eighth possible implementation form of a method according to the fourth, fifth, sixth, or seventh possible implementation form of the second aspect, the method further comprising generating the elements of the column wise excitation vector by using a geometric method such that the amplitude of the transmitted component broadcast signal has a variation less than an amplitude threshold value within an azimuth beamwidth.

In a ninth possible implementation form of a method according to the seventh or eighth possible implementation form of the second aspect, the geometric method is based on one or more parameters in the group comprising: radiation characteristics for the antenna elements, spatial distance between the antenna elements, frequency of the transmitted component broadcast signal, and the wanted azimuth beamwidth of the transmitted broadcast component signal.

In a tenth possible implementation form of a method according to the any of the preceding possible implementation forms of the second aspect or to the second aspect as such, Q≥2 and wherein the phase centre location is in the centre axis of the Q number of columns.

In an eleventh possible implementation form of a method according to the any of the preceding possible implementation forms of the second aspect or to the second aspect as such, each physical antenna port is coupled to a corresponding independent transmitter amplifier.

In a twelfth possible implementation form of a method according to the any of the preceding possible implementation forms of the second aspect or to the second aspect as such, the component broadcast signal is used as a cell specific reference signal or used in one or more broadcast signals for channels in the group comprising: Primary Synchronisation Channel, Secondary Synchronisation Channel, Physical Broadcast Channel, Physical Control Format Indicator Channel, Physical Hybrid Automatic Repeat Request Indicator Channel, and Physical Downlink Control Channel.

The advantages of the methods according to the second aspect are the same as those for the corresponding device claims according to the first aspects.

Embodiments of the present invention also relate to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION OF ILLUSTRATIVE EMBODIMENTS

Considering the conventional solutions described above embodiments of the present invention aim to transmit broadcast signals on a plurality of physical antenna ports of an antenna array with wide beam characteristics.

Figure 1:
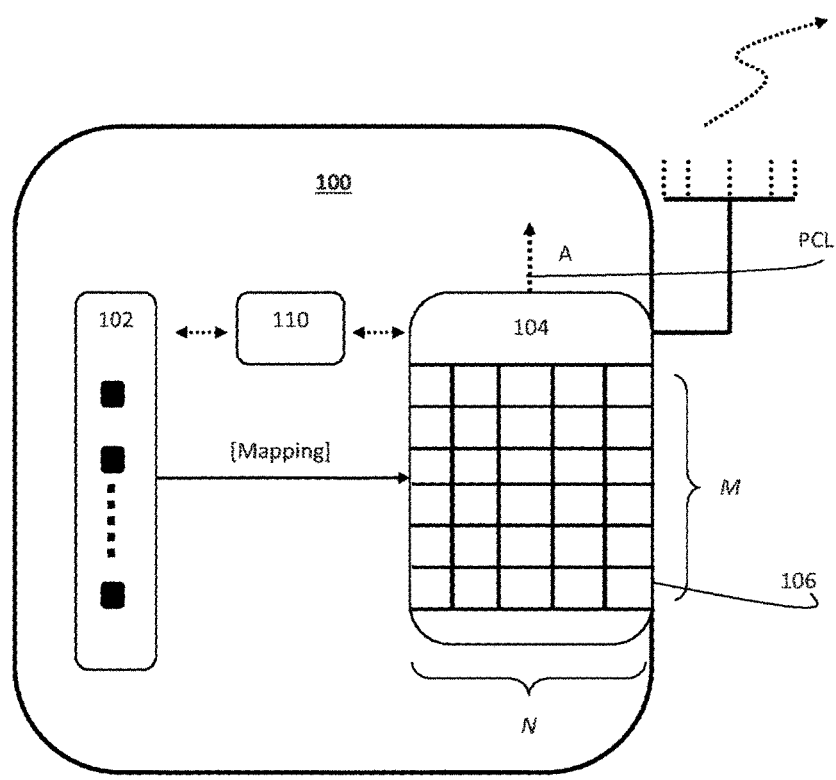
FIG. 1 shows a transmit device according to an embodiment of the present invention.

FIG. 1 shows a transmit device 100 according to an embodiment of the present invention. The transmit device 100 comprises at least one logical antenna port 102 (however a plurality of logical antenna ports are shown in FIG. 1) and an antenna array 104 having N number of columns and M number of rows. The logical antenna port(s) 102 is communicably coupled to the antenna array 104 according to well known techniques known in the art. The number of logical antenna ports in this disclosure is denoted S, where S≥1.

The logical antenna port 102 is configured to provide a broadcast component signal which is intended to be mapped on the physical antenna ports of the antenna array 104. Therefore, the antenna array 104 comprises one or more antenna elements 106, and each antenna element 106 comprises at least one physical antenna port 108 (see FIG. 3) in one Polarization (Pol). Each antenna element 106 therefore comprises P number of physical antenna ports, where P≥1.

Obviously, more than one logical antenna port 102 can be mapped on the physical antenna ports and the following description gives examples of such further implementations. Further, more about the antenna element 106, physical antenna port 108, and polarization is shown in FIG. 3.

The transmit device 100 further comprises a processor no which is configured to control the mapping between the logical antenna port(s) and the physical antenna ports of the antenna elements. Hence, the processor no according to the present solution is configured to select Q number of columns among the N number of columns of the antenna array 104, in which Q≤N. The processor no is further configured to determine a Phase Centre Location, PCL, for the logical antenna port 102. The phase centre location PCL is arranged in a point on a vertical axis A located in a space spanned by the Q number of columns as illustrated in FIG. 1. The vertical axis A is illustrated with the dotted arrow marked A in FIG. 1. The processor no is finally configured to map the logical antenna port 102 on the physical antenna ports of the N number of available columns based on the determined phase centre location PCL. The following description will more in detail explain and describe the determined phase centre location PCL. Further, the antenna array 104 is configured to transmit the broadcast component signal on the mapped physical antenna ports of the Q number of columns.

Figure 2:
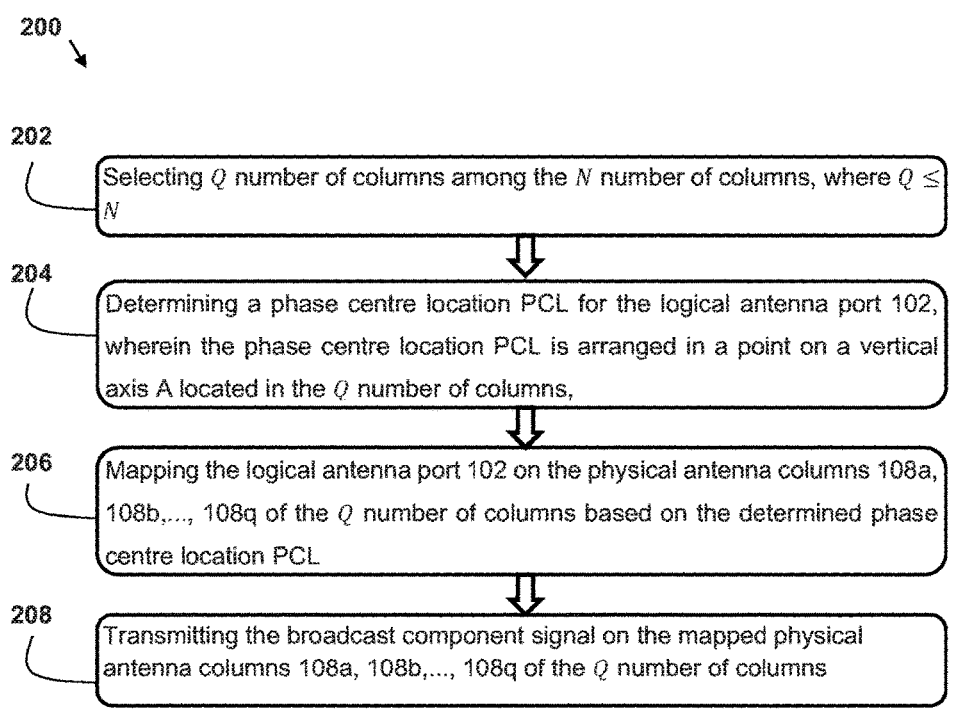
FIG. 2 shows a method according to an embodiment of the present invention.

FIG. 2 shows a corresponding method 200 according to an embodiment of the present invention. The method 200 may be executed in a transmit device 100, such as the one shown in FIG. 1. The present method 200 comprises the step of selecting 202 Q number of columns among the N number of columns, where Q≤N. The method 200 further comprises the step of determining 204 a phase centre location PCL for the logical antenna port 102. As described above the phase centre location PCL is arranged in a point on a vertical axis A located in the Q number of columns. The method 200 further comprises the step of mapping 206 the logical antenna port 102 on the physical antenna ports 108a, 108b, ..., 108q of the Q number of columns based on the determined phase centre location PCL. The method 200 finally comprises the step of transmitting 208 the broadcast component signal on the mapped physical antenna ports 108a, 108b, ..., 108q of the Q number of columns.

Figure 3:
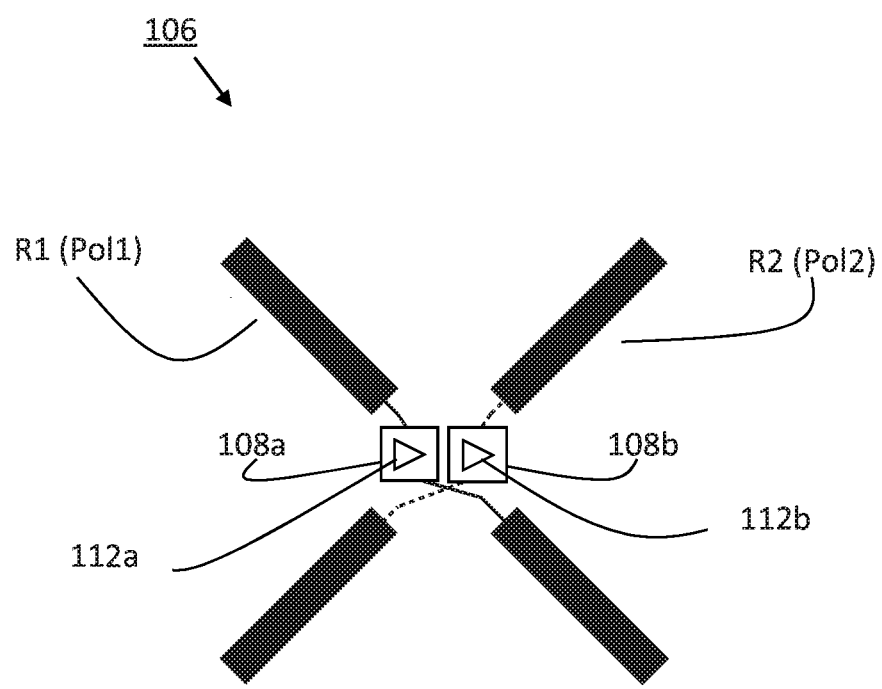
FIG. 3 shows an antenna element according to an embodiment of the present invention.

FIG. 3 shows and illustrates an antenna element 106 of the antenna array 104 according to an embodiment of the present invention. The antenna element 106 in FIG. 3 includes in this particular example two physical antenna ports 108a and 108b. Each physical antenna port 108a and 108b is connected to a respective radiator R1 and R2. Each of the two radiators R1 and R2 has orthogonal polarization Pol1 and Pol2 relative to each other. Hence, each antenna element 106 comprises two physical antenna ports 108 in a first polarization Pol1 and in a second polarization Pol2, respectively, and the first polarization Pol1 is orthogonal to the second polarization Pol2. Each of the two radiators R1 and R2 normally have orthogonal or close to orthogonal polarizations. In the example in FIG. 3 radiator R1 has −45 degrees polarization, while radiator R2 has +45 degrees polarization. Further, FIG. 3 also shows the embodiment in which each physical antenna port 108a and 108b has its own associated corresponding independent transmitter amplifier 112a and 112b, respectively.

Figure 4:
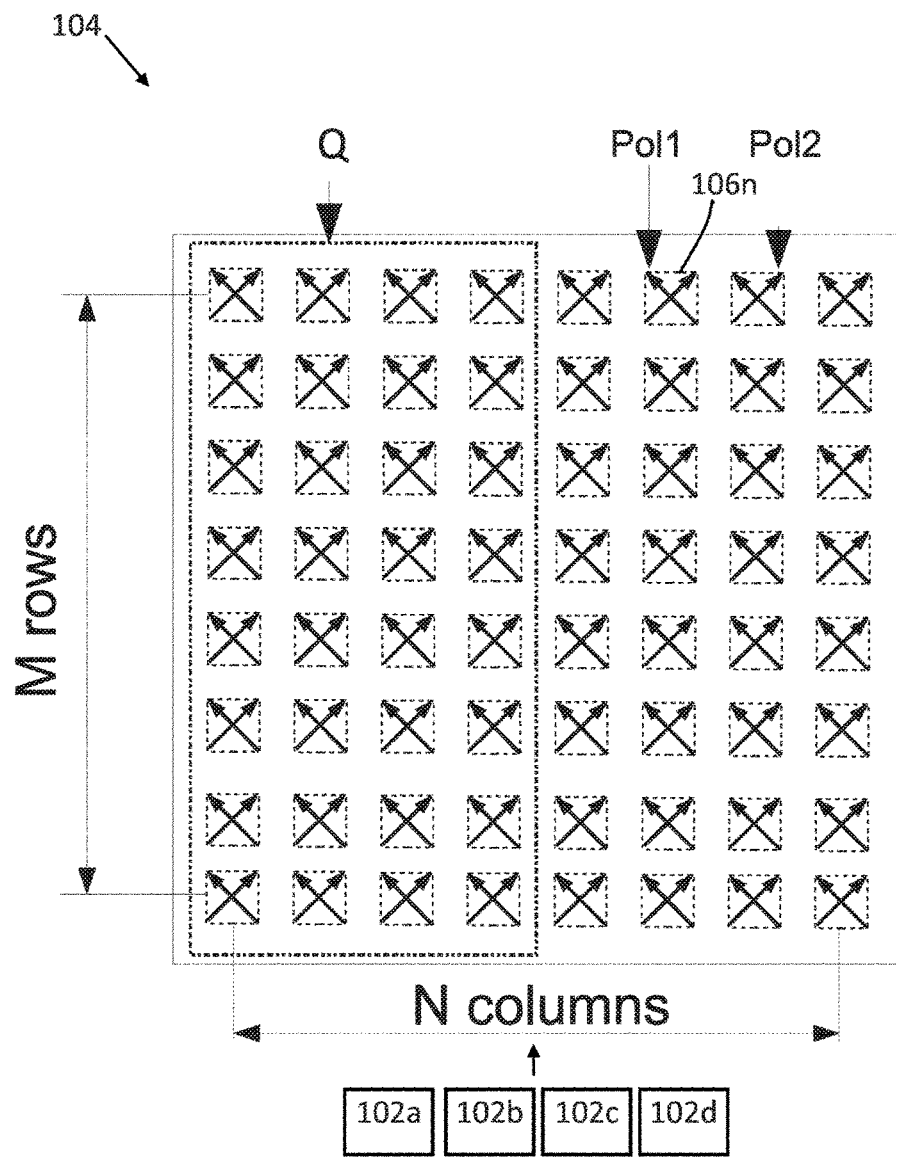
FIG. 4 shows an antenna array according to an embodiment of the present invention.

FIG. 4 illustrates a planar Massive MIMO (MM) antenna, such as the present antenna array 104, having M×N number of antenna elements, where M denotes the number of rows of the MM, and N denotes the number of columns of the MM. Further, the MM in this embodiment also included two polarizations, Pol1 and Pol2, for each antenna element 106 of the MM. The two polarizations Pol1 and Pol2 are illustrated as crossed arrows in FIG. 4. According to embodiments of the present invention a subset of the number of available columns N is selected and defined as subset Q. FIG. 4 also shows logical antenna ports 102a, 102b, 102c, and 102d to be mapped on the physical antenna ports of the antenna elements of the MM.

According to an embodiment of the present invention, the processor 110 is further configured to generate a row wise excitation vector and a column wise excitation vector based on the determined phase centre location PCL. The processor no is further configured to excite the component broadcast signal with the row wise excitation vector and the column wise excitation vector for controlling the elevation beam and the azimuth beam, respectively, of the transmitted component broadcast signal.

According to a further embodiment of the present invention, each column of the column wise excitation vector has an amplitude that is equal to: $1/\sqrt{Q}$; and each antenna element excitation being the combination of the row wise excitation vector and the column wise excitation vector has an amplitude that is equal to: $1/\sqrt{QM}$; and each physical antenna port excitation being the combination of a number of physical antenna ports P per antenna element and the row wise excitation vector and the column wise excitation vector has an amplitude that is equal to: $1/\sqrt{QMP}$.

It should be noted that the column wise excitation vector may be symmetric according to an embodiment of the present invention. The symmetry may in one example imply that that mirroring of the column wise excitation vector around its centre element results in the same vector.

According to yet further embodiment of the present invention, a geometric method is used for generating the elements of the column wise excitation vector based on the PCL. Each element of the excitation vectors comprises an amplitude component and a phase component as will be more described in the following description.

The present geometric method may e.g. be implemented as an algorithm in the processor no of the transmit device 100, e.g., in the form of a software executed in the processor 110. The software may be configured to receive parameters as input and calculate phase and amplitude for the different physical antenna ports of the antenna array and output these calculated phases and amplitudes.

The geometric method may according to one embodiment of the present invention be based on one or more input parameters in the group comprising: radiation characteristics for the antenna elements (included in the N columns), i.e. the wanted shape of the radiation intensity within the coverage beam, for instance maximum directivity, maximum ripple and intended beamwidth; spatial distance between the antenna elements, i.e. the geometrical distance between the centre of each radiating antenna element; frequency of the transmitted component broadcast signal i.e. the number of electromagnetic oscillations per second; the wanted azimuth beamwidth of the transmitted broadcast component signal.

Figure 6:
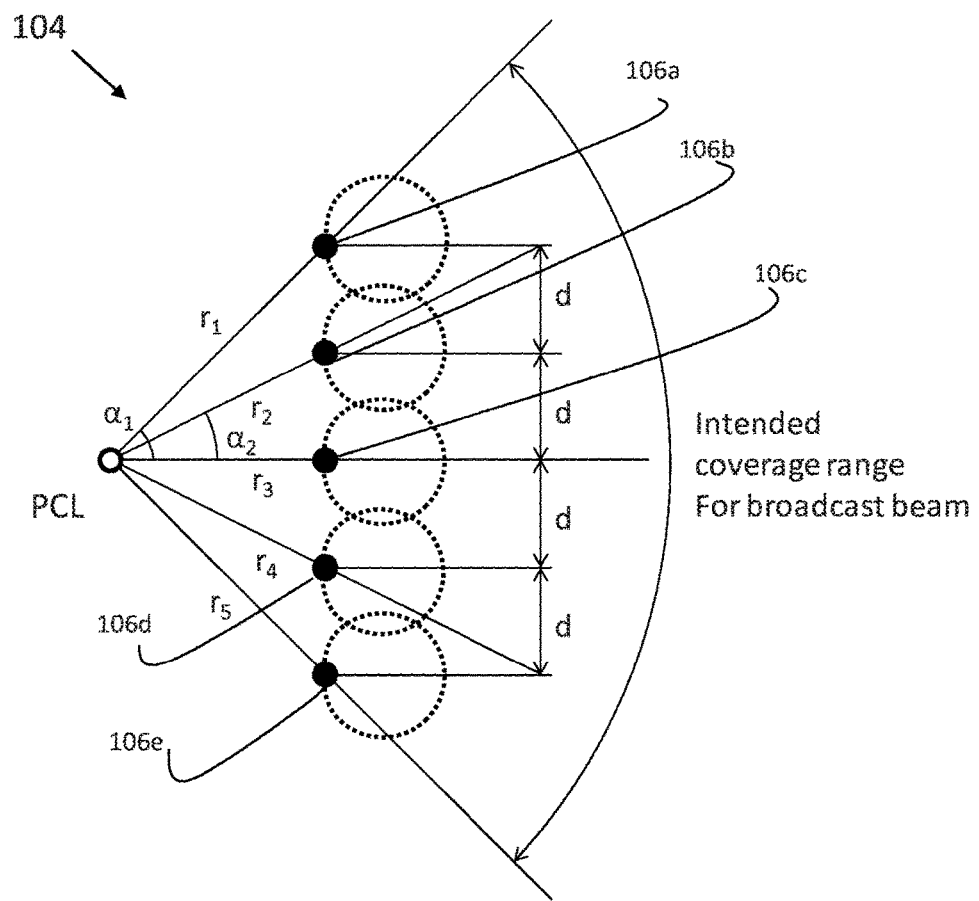
FIGS. 6-7 illustrate the geometric method according to embodiments of the present invention.
Figure 7:
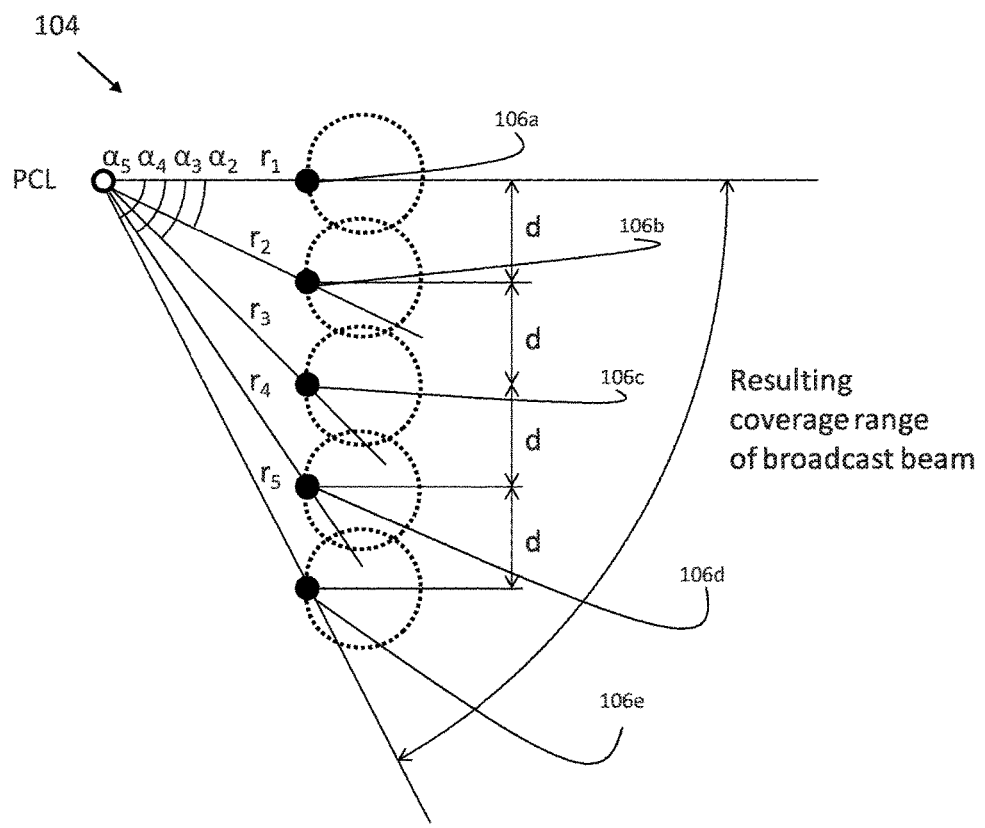

Different examples and illustrations of these embodiments are shown in FIGS. 6 and 7.

In one further embodiment of the present invention, the elements of the column wise excitation vector are generated by using a geometric method such that the phase of the transmitted component broadcast signal has a variation less than a phase threshold value within an azimuth beamwidth.

In yet another embodiment of the present invention, the elements of the column wise excitation vector are generated by using a geometric method such that the amplitude of the transmitted component broadcast signal has a variation less than an amplitude threshold value within an azimuth beamwidth.

In yet another embodiment of the present invention, the two above described embodiments are combined such that both the phase and the amplitude of the azimuth beamwidth are within respective threshold values. For realistic antenna elements located in an antenna array structure, it will be impossible to keep the phase front exactly flat due to small hardware impairments and mechanical tolerances. Therefore the phase and amplitude variation within the intended beamwidth instead needs to be designed to be within some threshold of small values. It could e.g. be reasonable to let the amplitude vary within ±1.5 dB and let the phase vary within ±30 degrees.

Figure 5:
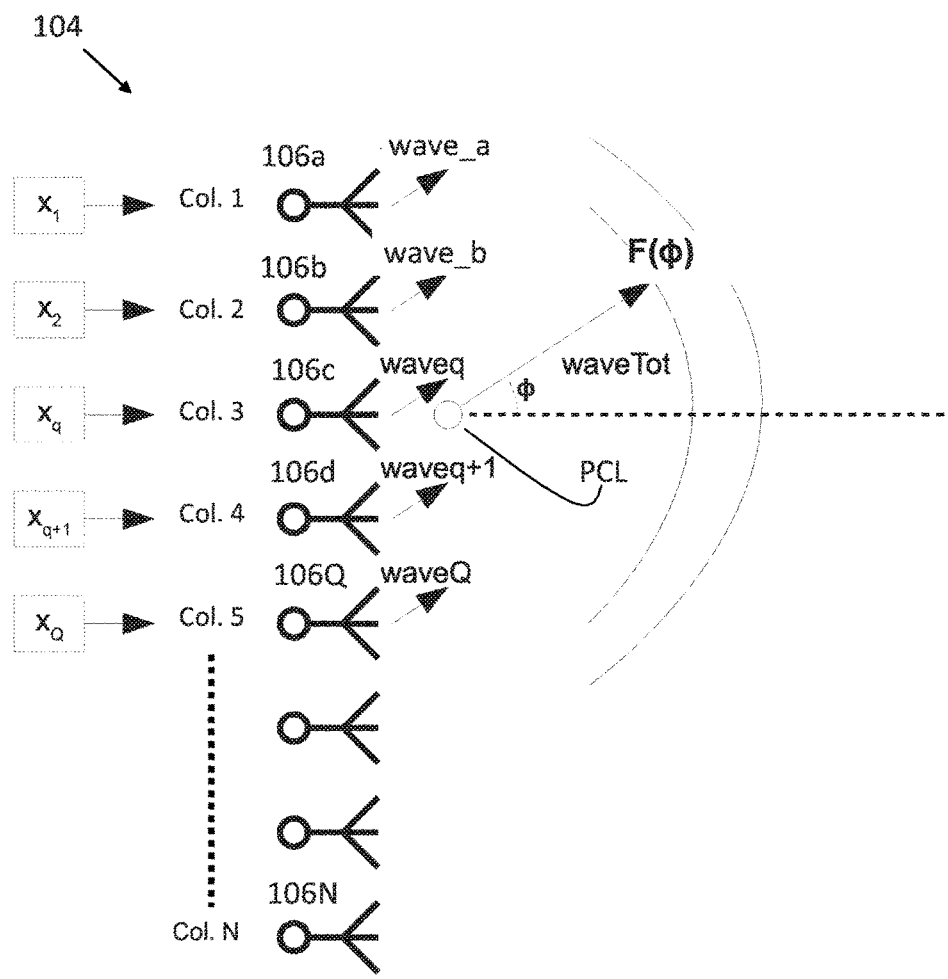
FIG. 5 illustrates a phase centre location according to an embodiment of the present invention.

FIG. 5 illustrates the concept of phase centre location PCL according to the present solution. The waves transmitted from a column subset Q of N available columns, or possibly all the N columns of the antenna array wave1, wave2, . . . , waveQ, will be combined in the air and generate a complex valued total radiation pattern $F(\phi)$ indicated as waveTot in FIG. 5. By optimizing the column-wise excitation elements $x_1, x_2, \ldots, x_Q$ phase centre location PCL for the column subset Q is determined.

FIG. 5 further describes how phase centre location PCL can be determined by choosing a number of columns Q out of the available columns N, and optimize the elements of the column wise excitation vector $x_1, x_2, \ldots, x_Q$ such that the phase front of the total radiated wave is constant or near constant within the desired wanted broadcast beamwidth. In the example in FIG. 5 a subset of five antenna elements, i.e. Q=5 is considered. Each antenna element 106 of the antenna array 104 has a sector radiation pattern of 65 degrees in this particular example. In the example in FIG. 5 the phase centre location PCL is located behind the third column Col. 3. One way to achieve this is to just let the centre antenna element of the five antenna elements be excited, i.e. the other antenna elements are turned off. It has been noted that the radiated phase becomes constant in all directions, which means that the radiated wave originates from the third vertical position in the antenna array 104. This configuration works, but only one of the N total available elements of the antenna array is used implying that only 1/N of the available power is used resulting in reduced performance.

One goal when determining the phase centre location PCL is to have the antenna elements of the column-wise excitation as equal as possible in terms of magnitude in order to make maximum possible use of the transmitter power amplifiers, and also with the goal of achieving a constant phase of $F(\theta)$ within the desired broadcast beamwidth.

FIG. 6 shows an example when the present geometric method is applied for generating the antenna elements of the column wise excitation vector. In FIG. 6, imagine we want to locate a PCL in the third antenna element of the five available antenna elements. This is simply done by letting only the third antenna element (106c) out of the five antenna element (106a-106d) be excited. The radiation pattern in this case originates from a phase centre location PCL located in the third antenna element 106c. Imagine that we instead let only the first antenna element (106a) out of the five antenna elements (106a-106d) be excited. We will then notice that the radiated phase will vary over the azimuth angles, which means that the radiated wave originates from another location than the third vertical position in the antenna array 104, i.e. now the phase centre location PCL is behind the first antenna element instead. The radiation intensity patterns for the two cases will look similar, but the radiated phase will emanate from another point than from the third antenna element.

FIG. 7 shows yet another example when the present geometric method is applied. The example in FIG. 7 is the case when all five antenna elements are excited with same amplitude and phase. This time we expect the wave to be radiated from the centre antenna element, because the excitations are symmetric around the third vertical antenna element. The resulting calculated radiation pattern will show that the phase is indeed constant within the main beam, but that the phase rapidly is changed with 180 degrees between each side lobe. Moreover, the main beam becomes very narrow when we use this uniform excitation (same amplitude, same phase) on all the antenna elements, which makes it unusable for broadcast coverage. The phase centre location PCL is though very constant within the 3 dB beamwidth. But we need to do something else to create a wider beamwidth, with a flat phase front within the beamwidth.

To find suitable amplitudes and phases for the antenna elements to accomplish a wide beam with constant phase centre, we will now exemplify a case where a geometric method is used to optimize the excitations. We again intend to locate the phase centre being the third antenna element according to FIG. 6. We analyze the configuration analytically by locating the antenna elements according to the illustrated configuration. The distance between the centre point of the antenna elements is d in FIGS. 6-7. The angle between the intended phase centre location PCL and each antenna element is an, where n denotes the index to the antenna element concerned in FIGS. 6-7. The distance from PCL to the centre point of each antenna element n is $r_n$ in FIGS. 6-7.

The assumption is first that $\alpha_1$ is 32.5 degrees (to achieve a beamwidth of 65 degrees). The assumption is also that the distance between the antenna elements d=0.5λ. This leads to in FIG. 6: $r_1$=$r_5$=1.86λ (for 106a and 106e), $r_2$=$r_4$=1.65λ (for 106b and 106d), $r_3$=1.57λ (for 106c), and $\alpha_2$=17.7°. The corresponding phase lengths are:

$(k*r_1)=(k*r_5)=2*\pi*1.86=11.69$ radian=310 degrees, $(k*r_2)=(k*r_4)=2*\pi*1.65=10.35$ radian=233 degrees, $(k*r_3)=2*\pi*1.57=9.87$ radian=205 degrees where k is the wave number k=2*π/λ.

So this means that antenna elements 106a and 106e should be excited with phases of 205 degrees−310 degrees=−105 degrees, antenna elements 106b and 106d should be excited with phases 205 degrees−233 degrees=−28 degrees, and the centre antenna element, i.e. antenna element 106c, should be excited with 0 degrees phase. We also need to find the amplitude compensation factors.

From known characteristics for the exemplary antenna elements in FIGS. 6 and 7, we know that the antenna element gain at 0 degrees is 7.2 dBi, at 17.7 degrees it is 6.3 dBi, at 32.5 degrees it is 4.2 dBi according to given radiation diagrams in this particular examples. Relative to antenna element 106c which has its maximum gain (7.2 dBi) in the intended direction, antenna elements 106b and 106d will need 0.9 dB amplification, antenna elements 106a and 106e will need 3 dB amplification, and antenna element 106c will need 0 dB (no amplification). Conversion from dB to linear scale gives that 3 dB⇆1.4 (linear amplitude), 1 dB⇆1.1 (linear amplitude), 0 dB⇆1 (linear amplitude). The corresponding amplitude excitations for the antenna elements are thus [1.4, 1.1, 1, 1.1, 1.4] (linear amplitude) after we have compensated for weighting up the beams depending on their radiation intensity in different directions. In this example we find that the amplitudes vary much between the different antenna elements of the antenna array. The outermost elements excited with amplitude 1.4, the innermost element excited with amplitude 1. It is possible also to optimize the beamwidth with constraints on the amplitude. It has been showed with a simple geometric method that a phase centre location PCL can be designed with some simple geometric algebra. It should be noted that the antenna radiation characteristics are only exemplary and different antenna elements have may have different antenna radiation characteristics depending on application.

The reason why we choose to locate the phase centre location PCL in the middle of the subgroup of Q columns, as illustrated in FIG. 6, and not for instance in the corner will now be illustrated. Again we use the geometrical model as shown in FIG. 7, which illustrates the present geometric method to find amplitude and phase excitations of the antenna elements to locate the phase centre behind the first antenna element. The resulting broadcast beam will not be directed in a direction in the boresight direction of the antenna array 104. Moreover, we will examine the consequences of the excitations needed, and how the radiation pattern looks like.

We still want to create a broadcast beam that is 65 degrees wide, so $\alpha_5$ is set to 65 degrees. This leads to: $r_1$=0.93λ, $r_2$=1.05λ, $r_3$=1.37λ, $r_4$=1.76λ, $r_5$=2.21λ, $\alpha_1$=0 degrees, $\alpha_2$=28.3 degrees, $\alpha_3$=47.1 degrees, $\alpha_4$=58.2 degrees, $\alpha_5$=65 degrees. The corresponding phase lengths are therefore:

$(k*r_1)=2*\pi*0.93=5.84$ radian=335 degrees, $(k*r_2)=2*\pi*1.05=6.60$ radian=378 degrees, $(k*r_3)=2*\pi*1.37=8.61$ radian=493 degrees, $(k*r_4)=2*\pi*1.76=11.06$ radian=634 degrees, $(k*r_5)=2*\pi*2.21=13.89$ radian=796 degrees, where k is the wave number k=2*π/λ.

This means that antenna element 106b should be excited with 335 degrees−378 degrees=−43 degrees, antenna element 106c should be excited with 335 degrees−493 degrees=−158 degrees, antenna element 106d should be excited with 335 degrees−634 degrees=−299 degrees, antenna element 106e should be excited with 335 degrees−796 degrees=−461 degrees=−101 degrees, and antenna element 106a should be excited with 0 degrees phase. We also need to find the amplitude compensation factors.

From known characteristics for the antenna elements in FIGS. 6 and 7 we know that the element gain at 0 degrees is 7.2 dBi, at 28.3 degrees it is 4.9 dBi, at 47.1 degrees it is 0.73 dBi, at 58.2 degrees it is −2.9 dBi, at 65 degrees it is −5.5 dBi. Relative to antenna element 106a which has its maximum gain (7.2 dBi) in the intended direction, antenna element 106b will need 2.3 dB amplification, antenna element 106c will need 6.5 dB amplification, antenna element 106d will need 10.1 dB amplification, and antenna element 106e will need 12.7 dB amplification. Antenna element 106a will not need any amplification since it is already radiating with maximum intensity in the intended direction, so the amplification for that element is hence 0 dB. Conversion from dB to linear scale gives that 0 dB⇆1 (linear amplitude), 2.3 dB⇆1.3 (linear amplitude), 6.5 dB⇆2.1 (linear amplitude), 10.1 dB⇆3.2 (linear amplitude), 12.7 dB⇆4.3 (linear amplitude). The corresponding amplitudes excitations for the antenna elements are hence [1,1.3, 2.1, 3.2, 4.3] (linear amplitude) after we have compensated for weighting up the beams depending on their radiation intensity in different directions. In this example we find that the amplitudes vary much between the different antenna elements, the antenna element with highest excitation amplitude with amplitude 4.3 whilst the innermost antenna element excited with amplitude 1.

From experiments it has been have found that the phase front for the example in FIG. 7 indeed becomes quite flat in the direction that we wanted to optimize for, but the amplitude shape of the broadcast beam become distorted, and the ratio between the highest excitation amplitude and the weakest excitation amplitude is high, the relation is 4.3:1, so choosing a phase centre location PCL other than the centre location of the Q antenna elements is not a good choice if we want even amplitudes for the different antenna elements.

Furthermore, for the cases when we need to transmit more than one broadcast beam from the same antenna array 104, it will be beneficial from a diversity point of view to transmit the broadcast beams from different phase centre locations of the antenna array 104. The reason for this is that the environment between the transmit device 100 and a receiver includes a number of scatterers, e.g. houses, trees, the ground, mountains etc., where the radiated waves from the transmit device 100 will be reflected and retransmitted towards a receiver device. If the phase centre locations PCLs for the different broadcast beams would be equal, then the distance between each phase centre location and the scatterer would also be equal, and there would be a sacrifice in the possibilities to achieve the diversity schemes available by Transmit Diversity (TD). With different phase centre locations we also enable the possibility to switch phase centre for the radio signals and thereby achieve higher diversity for these signals as well. For the case of supporting legacy transmission of CRS signals, the phase centre locations that can be created, will in effect lead to that the MM BS behaves like a legacy Base station, transmitting wide beams with the CRS signals from distinct phase centre location points on the MM antenna aperture.

In the following disclosure different exemplary embodiments of the present invention are described. It is however noted that the present solution is not limited to the described embodiments. As will been seen in FIGS. 8-11, each column wise excitation $x_1, x_2, x_3, \ldots, x_Q$ is in turn multiplied with a row excitation $y_1, y_2, y_3, \ldots, y_M$, where M denotes the total number of available rows. Furthermore, each physical antenna element may have P number of physical antenna ports (normally 1 or 2 with two orthogonal polarizations). This finally results in element excitations $z_{m,n}$ that are the excitations per physical antenna port due to the combination of a column excitation $x_n$ multiplied with a row excitation $y_m$ and split on the physical antenna ports available on each physical antenna element. This makes it possible to direct the elevation beam coverage in the desired elevation direction. One particular aspect, in MM beamforming compared to conventional BS beamforming is that we to the largest possible extent want to use all available power of the transmitters in the vertical domain, i.e. full power, constant amplitude, in order to make maximum use of the power available in the transmitter amplifiers.

Mapping of a Single Logical Antenna Port on a Large MIMO Antenna Array

Figure 8:
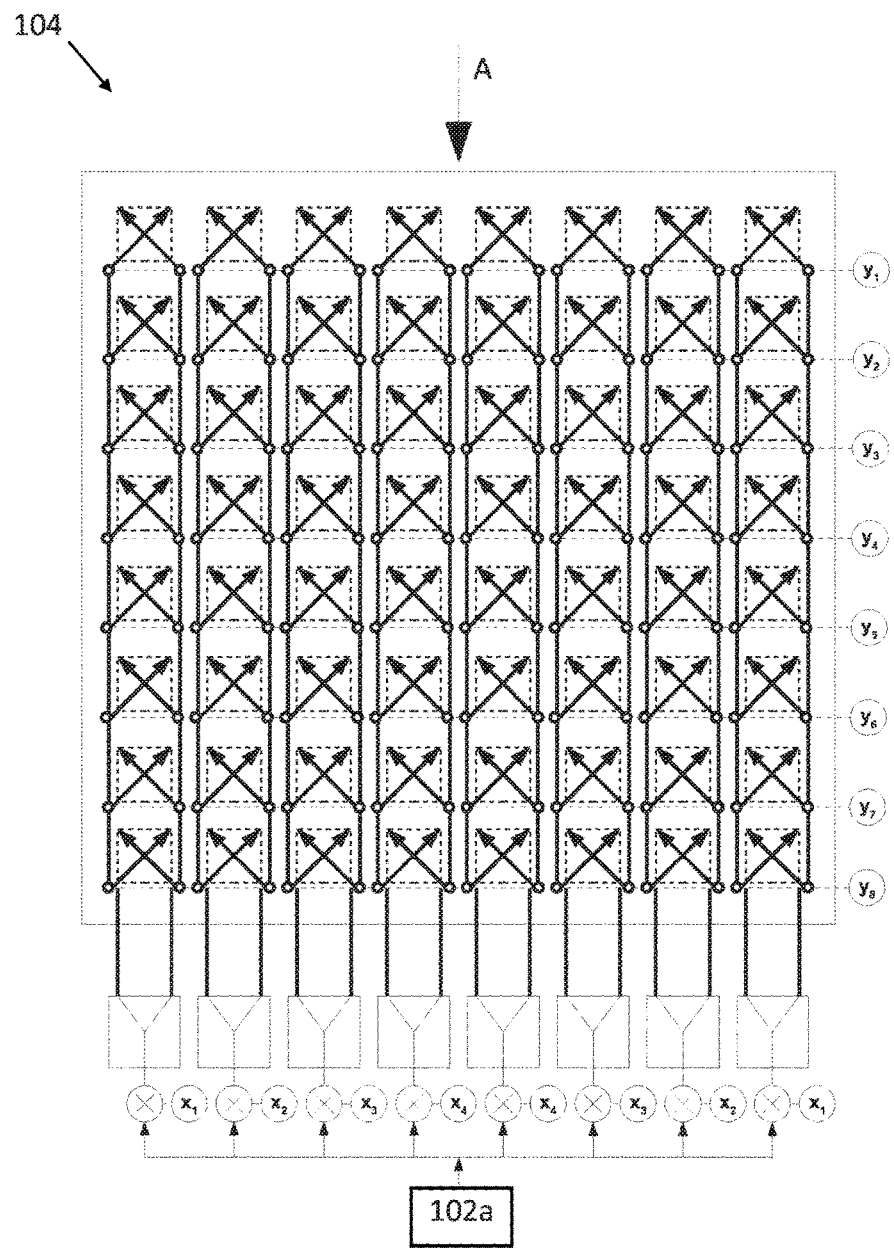
FIGS. 8-11 show different further embodiments of the present invention.
Figure 9:
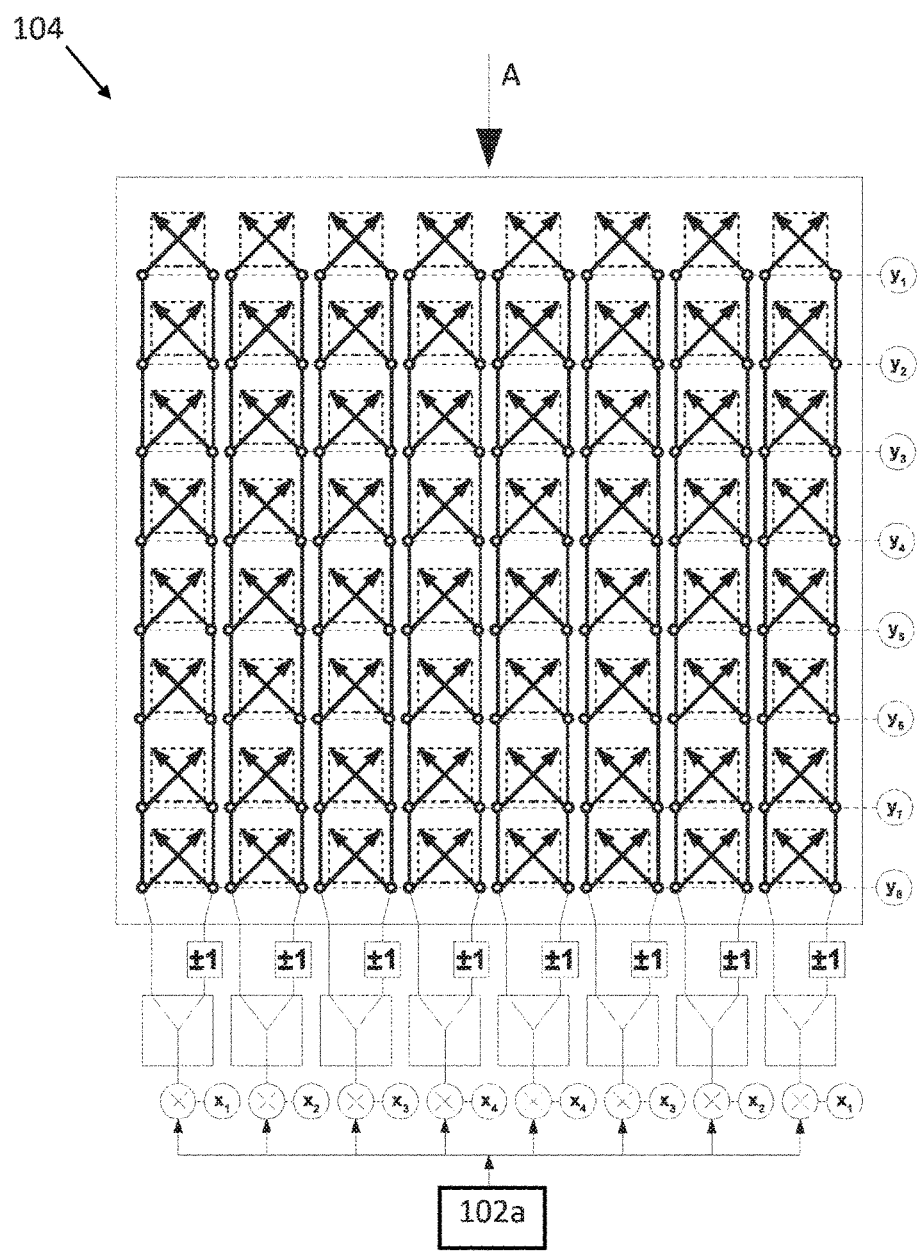

For the case of having just one available logical antenna port (i.e. S=1) in the transmit device 100, we aim to map this single logical port 102 onto all available physical antenna ports (M×N×P). FIGS. 8 and 9 illustrate the transmit device 100 according to these embodiments.

FIG. 8 shows the example of mapping the single logical antenna port iota on an antenna array constituting 8(vertical (M))×8(horizontal (N))×2(polarizations (P)) physical antenna ports. Due to the symmetry of the column wise excitations, $x_1, x_2, x_3, x_4, x_4, x_3, x_2, x_1$, the phase centre axis A is located in the middle of the antenna array. For FIG. 8 case both polarizations of every column get the same excitation.

FIG. 9 shows the example of mapping the single logical antenna port 102*a* on an antenna array constituting 8(vertical (M))×8(horizontal (N))×2(polarizations (P)) physical antenna ports. Due to the symmetry of the column wise excitations, $x_1, x_2, x_3, x_4, x_4, x_3, x_2, x_1$, the phase centre axis A is located in the middle of the antenna array. By multiplying the second polarization with either +1 or −1, the resulting polarization for the broadcast beam could be either vertical or horizontal. For the FIG. 9 case an option to multiply the second polarization with −1 is illustrated which rotates the resulting polarization with 90 degrees. Note that the column wise excitation is symmetrical, i.e. leftmost antenna elements have same excitations as the rightmost antenna elements. This is needed in order to achieve a symmetrical broadcast pattern. The excitation column wise vector should be normalized, so that it does not add nor subtract energy relative to the signal transmitted on the logical antenna port.

Mapping of Two Logical Antenna Ports on Large MIMO Antenna Array

Figure 10:
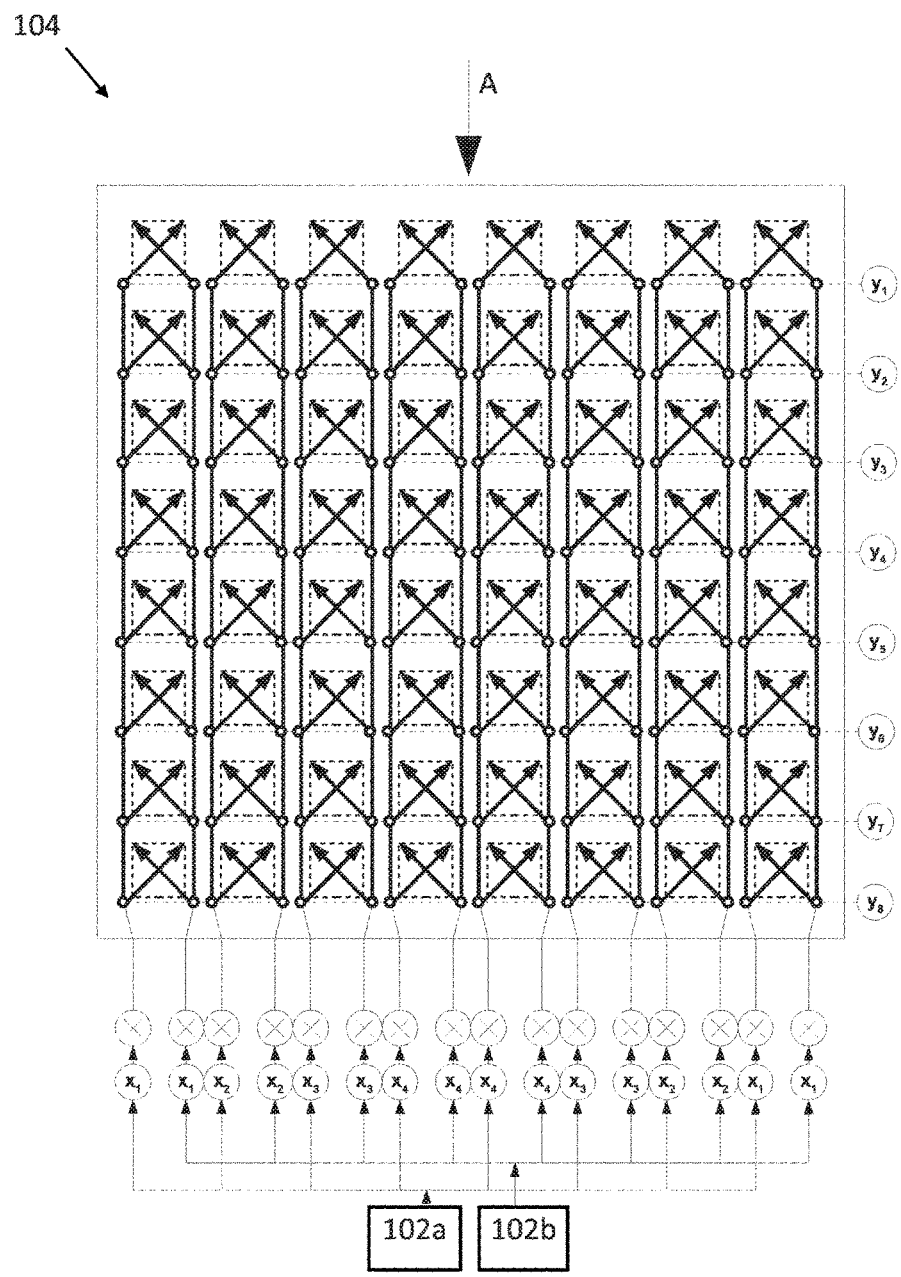

For the case of having two available logical ports 102*a* and 102*b* (i.e. S=2) in the transmit device 100, we aim to map each logical port per antenna polarization port in the transmit device 100. FIG. 10 illustrates this embodiment. As can be seen, both polarizations of every column get the same excitation, but each polarization is dedicated to one logical antenna port. Moreover, the column excitation vector is symmetrical in the sense that if it is mirrored both along the horizontal axis and the vertical axis, it looks the same. This is needed in order to achieve a symmetrical broadcast pattern of the beam. Moreover, the column wise excitation vector is normalized, so that it does not add nor subtract energy relative to the broadcast signal transmitted on the logical antenna ports.

FIG. 10 shows as mentioned above the example of mapping two logical antenna ports 102*a* and 102*b* on an antenna array constituting 8(vertical (M))×8(horizontal (N))×2(polarizations (P)) physical antenna ports. Due to the symmetry of the column excitations, $x_1, x_2, x_3, x_4, x_4, x_3, x_2, x_1$, the phase centre axis A is located in the middle of the antenna array. By mapping 102*a* to the +45 degrees polarized elements and 102*b* to the −45 degrees polarized elements, each of the logical antenna ports will generate a broadcast beam with the phase centre in the middle of the antenna array and with either +45 degrees or −45 degrees polarization.

Mapping of Four Logical Antenna Ports on Large MIMO Antenna Array

Figure 11:
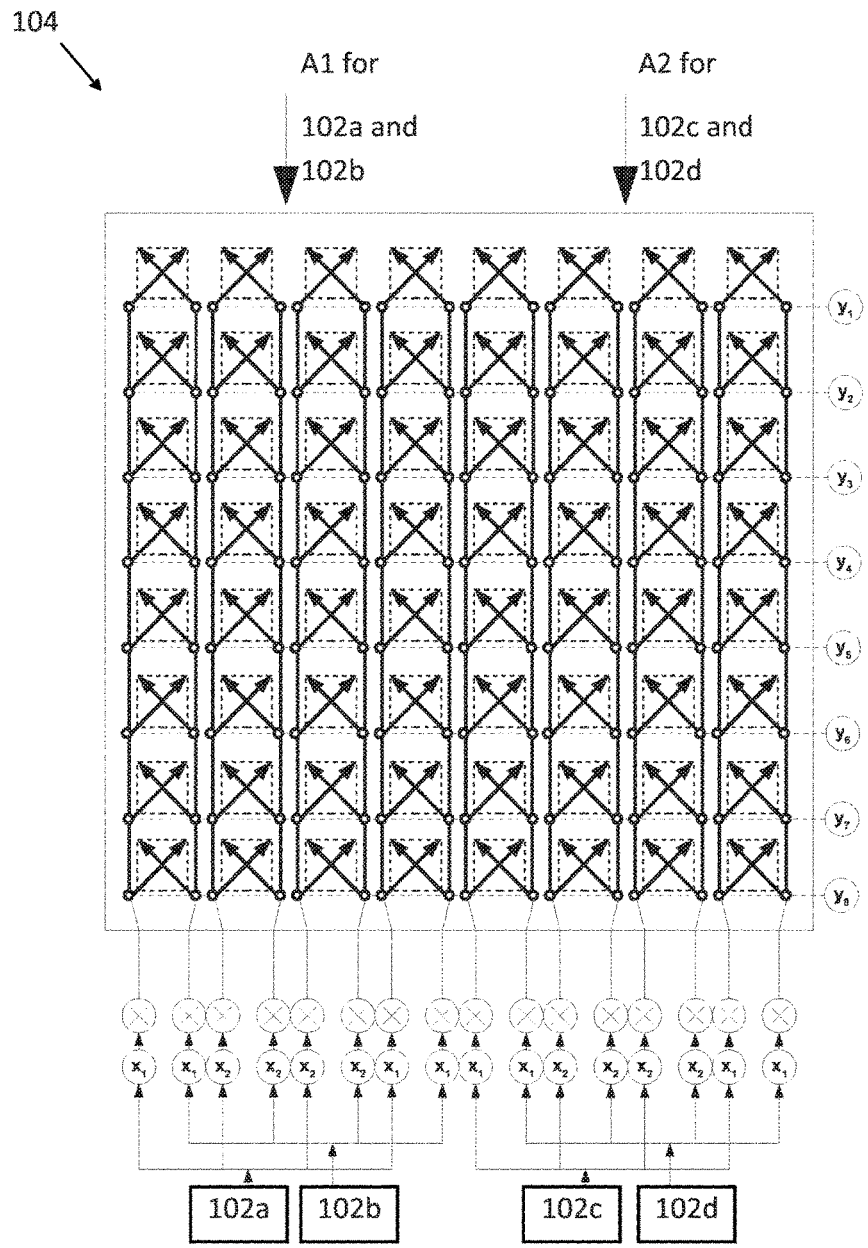

FIG. 11 shows the example of mapping four logical antenna ports 102*a*, 102*b*, 102*c* and 102*d* (i.e. S=4) on an antenna array constituting 8(vertical (M))×8(horizontal (N))×2(polarizations (P)) physical antenna ports. Due to the symmetry of the column excitations, $x_1, x_2, x_2, x_1$, for each logical antenna port, and the selection of a subset Q of the total available columns (in this example four columns out of eight) for each logical antenna port, the phase centre axis A1 and A2 for each logical antenna port is located in the middle of the selected subset columns Q1 or Q2. Logical antenna ports 102*a* and 102*b* (with centre axis A1) in this example have the same subset of columns Q1, 1, 2, 3, 4, but orthogonal polarizations (i.e. +45 or −45 degrees), whereas logical antenna ports 102*c* and 102*d* (with centre axis A2) have another subset of columns Q2, 5,6,7,8, and also orthogonal polarizations (i.e. +45 or −45 degrees). This configuration creates orthogonality between all four logical antenna ports even if 102*a*, 102*b*, and 102*c*, 102*d* pairs have the same polarizations.

For the case of having four available logical antenna ports in the transmit device 100, we aim to map each logical antenna port to one polarization in the system (Pol1, Pol2), and also map each logical antenna port on a subset Q of the available antenna columns N. FIG. 11 illustrates the transmit device 100. As can be seen, both polarizations of every column get the same excitation, but each polarization is dedicated to one logical antenna port 102a, 102b, 102c or 102d, and a subgroup Q1 and Q2 out of N columns.

According to an embodiment of the present invention, each antenna element 106 is coupled to a corresponding independent transmitter amplifier 112. One of the targets usually related with MM systems, is that instead of using one strong power amplifier feeding the complete antenna array, smaller cheaper amplifiers can be used, closely located to the physical antenna elements, so that losses can be minimized and cost can be kept down. With MM systems comes the possibility to systemize the BS antenna in a completely new way. The complicated feeding system can be discarded and instead locate small active Radio Frequency (RF) circuits (like Power Amplifiers (PAs) and Low Noise Amplifiers (LNAs) and other circuitry) very close to the antenna elements. The reason for this is that MM by its fundamental principles is based on the fact that baseband processing must involve very many BS antenna elements (preferably all of them), and active analogue circuits and AD/DA conversion must hence be done as close to the antenna elements as possible.

According to another embodiment of the present invention, the component broadcast signal is used as a cell specific reference signal or used in one or more broadcast signals for channels in the group comprising: Primary Synchronisation Channel, Secondary Synchronisation Channel, Physical Broadcast Channel, Physical Control Format Indicator Channel, Physical Hybrid Automatic Repeat Request Indicator Channel, and Physical Downlink Control Channel. All of these mentioned channels are used for such signals that need to be broadcasted all over the coverage cell of the transmit device 100. It is therefore important to achieve a wide beamforming in the azimuth and the elevation planes to secure that the radiation is heard in all directions where the user devices, we want to transmit to, are located.

Figure 12:
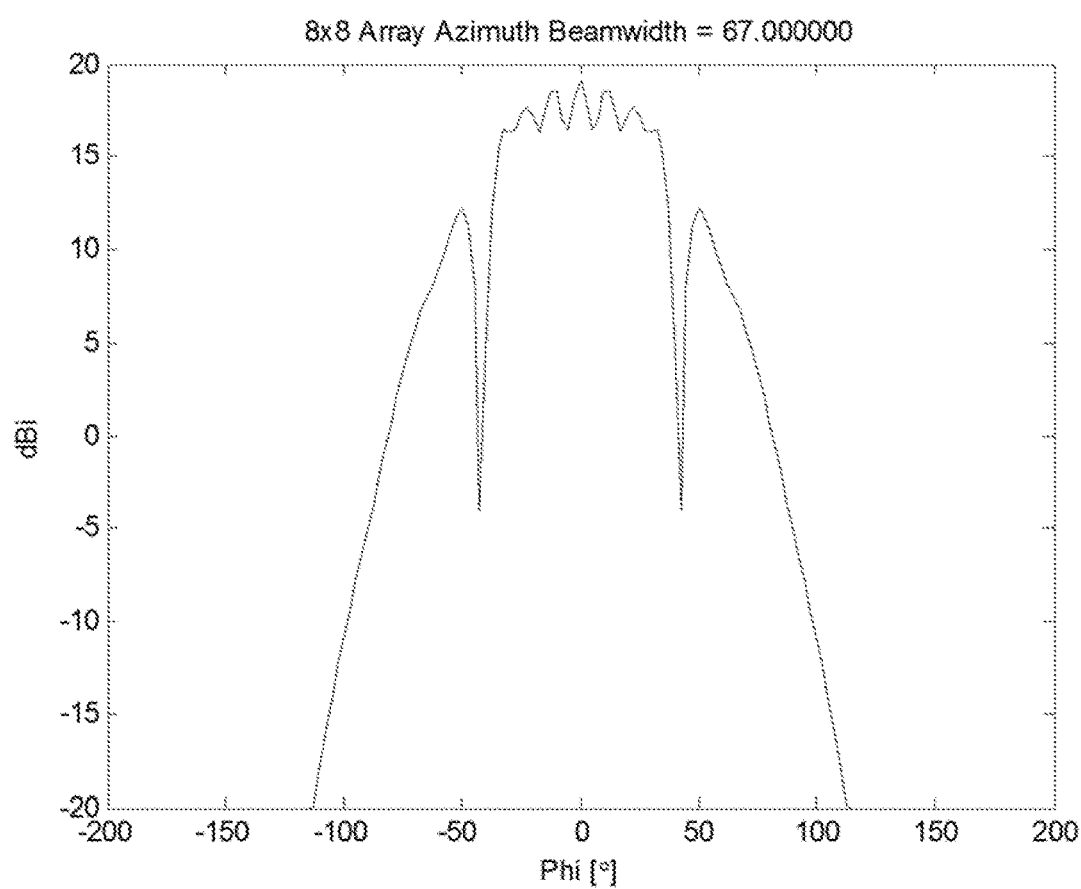
FIG. 12 shows performance azimuth beamwidth.

FIG. 12 shows an antenna array azimuth beamwidth of a solution according to an embodiment of the present invention for an antenna array having 8×8 antenna elements. The horizontal axis of FIG. 12 shows the phase in degrees and the vertical axis shows the gain radiation pattern in dBi. Generally, the effects of the present solution is that the component broadcast beams will get a much higher Effective Isotropic Radiated Power (EIRP) compared to the case where the broadcast beams are mapped to a few physical antenna ports only. For instance, if PSS/SSS signals are mapped on four columns instead of just one column, a resulting EIRP gain of 6 dB is achieved. The phase centre location PCL created by exciting a number of columns Q with a proper excitation vector $[x_1, x_2, \ldots, x_Q]$ leads to a radiated field $F(\phi)$, which has a constant (or nearly constant) phase over an intended broadcast beam coverage beamwidth $-\phi_{BW/2} < \phi < \phi_{BW/2}$. This further has the effect that the combined wave has low ripple and good coverage within the intended beamwidth.

Figure 13:
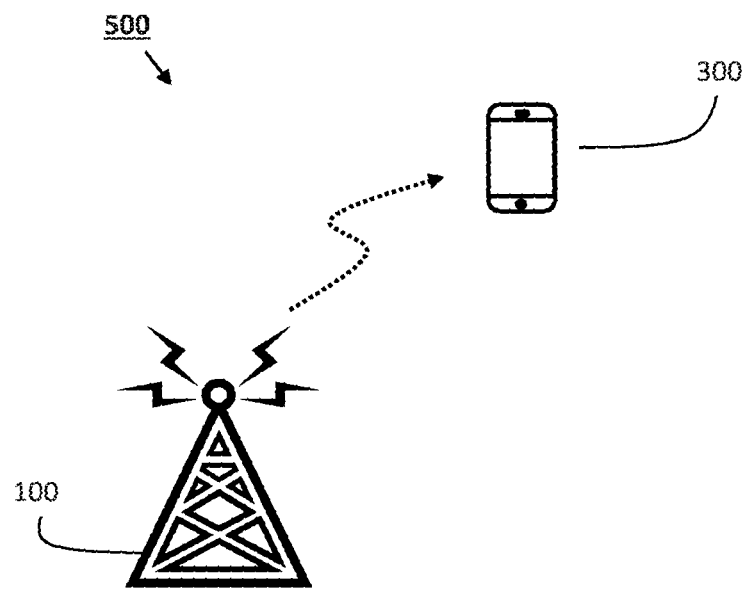
FIG. 13 shows an exemplary wireless communication system according to an embodiment of the present invention.

FIG. 13 illustrates an exemplary wireless communication system 500 according to an embodiment of the present invention. A transmit device 100 as described in this disclosure transmits broadcast component signals to a receiver device 300 in the wireless communication system 500. The transmit device 100 is in this example a radio network node and the receiver device 300 a User Equipment (UE).

The transmit device 100 according to embodiments of the present invention may be a radio network node, or base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

The receiver device 300 may be a User Equipment (UE), mobile station, wireless terminal and/or mobile terminal is enabled to communicate wirelessly in a wireless communication system, sometimes also referred to as a cellular radio system. The User Equipment (UE) may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

Furthermore, any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present first network node and second network node comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A transmit device, comprising:
 a logical antenna port configured to provide a broadcast component signal;
 an antenna array having M number of rows and N number of columns of antenna elements, wherein each antenna element comprises a physical antenna port in one polarization;
 a processor, configured to:
  select Q number of columns among the N number of columns, where Q≤N;
  determine a phase centre location (PCL) for the logical antenna port, wherein the PCL is arranged in a point on a vertical axis (A) located in the Q number of columns; and
  map the logical antenna port on the physical antenna ports of the Q number of columns based on the determined PCL;
 wherein the antenna array is configured to transmit the broadcast component signal on the mapped physical antenna ports of the Q number of columns.

2. The transmit device according to claim 1, wherein each antenna element comprises two physical antenna ports in a first polarization and in a second polarization, respectively, wherein the first polarization is orthogonal to the second polarization.

3. The transmit device according to claim 1, wherein the transmit device comprises one logical antenna port and wherein Q=N.

4. The transmit device according to claim 1, wherein the transmit device comprises two logical antenna ports, wherein Q=N, and wherein one logical antenna port is mapped on the physical antenna ports in a first polarization and wherein the other logical antenna port is mapped on the physical antenna ports in a second polarization.

5. The transmit device according to claim 1, wherein the processor is further configured to:
 generate a row wise excitation vector and a column wise excitation vector based on the PCL; and
 excite the component broadcast signal with the row wise excitation vector and the column wise excitation vector for controlling an elevation beam and an azimuth beam, respectively, of the transmitted component broadcast signal.

6. The transmit device according to claim 5, wherein each column of the column wise excitation vector has an amplitude that is equal to: $1/\sqrt{Q}$, each antenna element excitation being the combination of the row wise excitation vector and the column wise excitation vector has an amplitude that is equal to: $1/\sqrt{QM}$, and each physical antenna port excitation being the combination of a number of physical antenna ports P per antenna element and the row wise excitation vector and the column wise excitation vector has an amplitude that is equal to: $1/\sqrt{QMP}$.

7. The transmit device according to claim 5, wherein the column wise excitation vector is symmetric.

8. The transmit device according to claim 5, wherein the elements of the column wise excitation vector are generated using a geometric method such that the phase of the transmitted component broadcast signal has a variation less than a phase threshold value within an azimuth beamwidth.

9. The transmit device according to claim 8, wherein the geometric method is based on one or more parameters in the group comprising: radiation characteristics for the antenna elements, spatial distance between the antenna elements, frequency of the transmitted component broadcast signal, and a target azimuth beamwidth of the transmitted broadcast component signal.

10. The transmit device according to claim 5, wherein the elements of the column wise excitation vector are generated using a geometric method such that an amplitude of the transmitted component broadcast signal has a variation less than an amplitude threshold value within an azimuth beamwidth.

11. The transmit device according to claim 1, wherein Q≥2, and wherein the PCL is in a centre axis (A) of the Q number of columns.

12. The transmit device according to claim 1, wherein each physical antenna port is coupled to a corresponding independent transmitter amplifier.

13. The transmit device according to claim 1, wherein the component broadcast signal is used as a cell specific reference signal or used in one or more broadcast signals for channels in the group comprising: Primary Synchronisation Channel, Secondary Synchronisation Channel, Physical Broadcast Channel, Physical Control Format Indicator Channel, Physical Hybrid Automatic Repeat Request Indicator Channel, and Physical Downlink Control Channel.

14. A method, comprising
 selecting Q number of columns of an antenna array, wherein the antenna array has M number of rows and N number of columns of antenna elements, wherein each antenna element comprises a physical antenna port in one polarization, wherein Q≤N, wherein the antenna array is comprised in a transmit device, and wherein the transmit device further comprises a logical antenna port, configured to provide a broadcast component signal;
 determining a phase centre location (PCL) for the logical antenna port, wherein the PCL is arranged in a point on a vertical axis (A) located in the Q number of columns;
 mapping the logical antenna port on the physical antenna ports of the Q number of columns based on the determined phase centre location (PCL); and
 transmitting the broadcast component signal on the mapped physical antenna ports of the Q number of columns.

15. A computer program comprising a program code for performing the method according to claim 14 when the computer program runs on a computer.

16. The method according to claim 14, wherein Q=N.

17. The method according to claim 14, further comprising:
 generating a row wise excitation vector and a column wise excitation vector based on the PCL; and
 exciting the component broadcast signal with the row wise excitation vector and the column wise excitation vector for controlling an elevation beam and an azimuth beam, respectively, of the transmitted component broadcast signal.

18. A non-transitory computer readable storage medium storing instructions that, when executed by a processor, cause a computer to:
 select Q number of columns of an antenna array, wherein the antenna array has M number of rows and N number of columns of antenna elements, wherein each antenna element comprises a physical antenna port in one polarization, wherein $Q \leq N$, wherein the antenna array is comprised in a transmit device, and wherein the transmit device further comprises a logical antenna port, configured to provide a broadcast component signal;

determine a phase centre location (PCL) for the logical antenna port, wherein the PCL is arranged in a point on a vertical axis (A) located in the Q number of columns;

map the logical antenna port on the physical antenna ports of the Q number of columns based on the determined phase centre location (PCL); and transmit the broadcast component signal on the mapped physical antenna ports of the Q number of columns.

19. The non-transitory computer readable storage medium storing instructions according to claim 18, wherein each antenna element comprises two physical antenna ports in a first polarization and in a second polarization, respectively, wherein the first polarization is orthogonal to the second polarization.

20. The non-transitory computer readable storage medium storing instructions according to claim 18, wherein the transmit device comprises one logical antenna port and wherein $Q=N$.

* * * * *